United States Patent
Lycoudis

(10) Patent No.: US 7,412,859 B2
(45) Date of Patent: Aug. 19, 2008

(54) DEVICE FOR IMMOBILISING A MOTOR VEHICLE

(75) Inventor: Robert Lycoudis, 8 Banner Court, Glen Waverley, Victoria (AU) 3150

(73) Assignees: OAI Pty Ltd, Malvern, Victoria (AU); Robert Lycoudis, Malvern, Victoria (AU)

( * ) Notice: Subject to any disclaimer, the term of this patent is extended or adjusted under 35 U.S.C. 154(b) by 0 days.

(21) Appl. No.: 11/707,752

(22) Filed: Feb. 16, 2007

(65) Prior Publication Data

US 2007/0277568 A1 Dec. 6, 2007

Related U.S. Application Data

(63) Continuation of application No. 11/398,478, filed on Apr. 5, 2006, now abandoned, which is a continuation of application No. 10/515,447, filed as application No. PCT/AU03/00631 on Jul. 26, 2005, now abandoned.

(30) Foreign Application Priority Data

May 22, 2002 (AU) ..................................... PS 2489

(51) Int. Cl.
*B60R 25/08* (2006.01)
(52) U.S. Cl. ....................................................... 70/202
(58) Field of Classification Search .................. 70/202, 70/198–203, 237, 238, 254
See application file for complete search history.

(56) References Cited

U.S. PATENT DOCUMENTS

| | | | |
|---|---|---|---|
| 1,389,966 A | 9/1921 | Bishop |
| 1,442,203 A | 1/1923 | Wiliams et al. |
| 1,516,482 A | 11/1924 | Granville |
| 1,519,534 A | 12/1924 | Erickson |
| 1,569,721 A | 1/1926 | Dalferes |
| 3,898,823 A | 8/1975 | Ludeman |
| 4,632,209 A | 12/1986 | Russell |
| 4,747,465 A | 5/1988 | Hodgson |
| 4,779,435 A | 10/1988 | Farrow |
| 4,876,865 A | 10/1989 | Trinidad et al. |
| 5,040,387 A | 8/1991 | Knott, Jr. |
| 5,094,092 A | 3/1992 | Hsieh |
| 5,267,458 A | 12/1993 | Heh |
| 5,282,373 A | 2/1994 | Riccitell |
| 5,345,796 A | 9/1994 | Chieh et al. |
| 5,482,136 A | 1/1996 | Sorkin |
| 5,537,846 A | 7/1996 | Simon |
| 5,704,233 A | 1/1998 | Farshad |
| 5,713,539 A | 2/1998 | Russ et al. |

(Continued)

FOREIGN PATENT DOCUMENTS

FR 999 336 A 1/1952

*Primary Examiner*—Lloyd A Gall
(74) *Attorney, Agent, or Firm*—Volpe and Koenig P.C.

(57) ABSTRACT

A method of and device for immobilising a motor vehicle having a foot actuated brake pedal affixed at the end of a pedal arm. A pedal clasping portion of the immobilisation device is hooked around the brake pedal and a rigid strut portion slides from an elongate body portion where it is locked in such extended position to prevent depression of the brake pedal to its actuating position. The pedal clasping portion has the form of a deep channel firmly affixed to the elongate body portion of the device and may have a cutout in one of the flanges through which the pedal arm passes.

16 Claims, 8 Drawing Sheets

U.S. PATENT DOCUMENTS

| | | |
|---|---|---|
| 5,906,121 A | 5/1999 | Mankarious |
| 5,911,765 A | 6/1999 | DaSilva |
| 6,006,559 A | 12/1999 | Hsu |
| 6,029,483 A | 2/2000 | Daniels |
| 6,085,559 A | 7/2000 | Jarrett |
| 6,439,012 B1 | 8/2002 | Chen |
| 6,575,002 B1 | 6/2003 | Hsu |
| 6,792,780 B1 | 9/2004 | De Lucia |

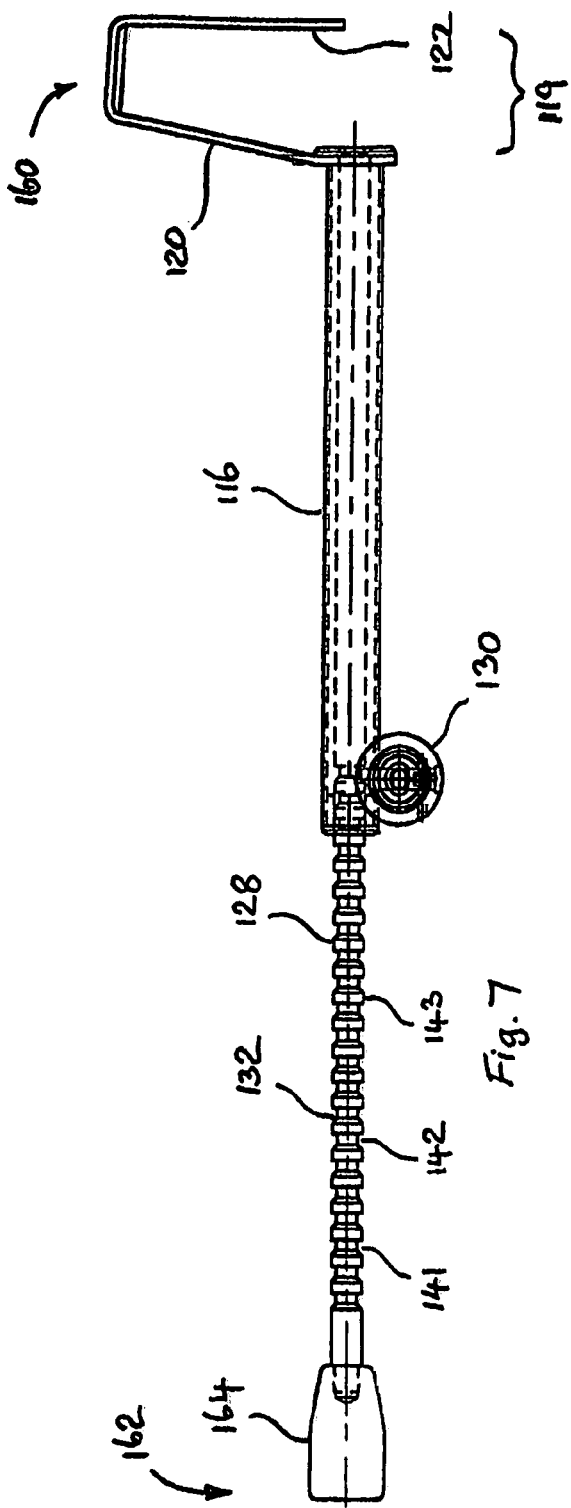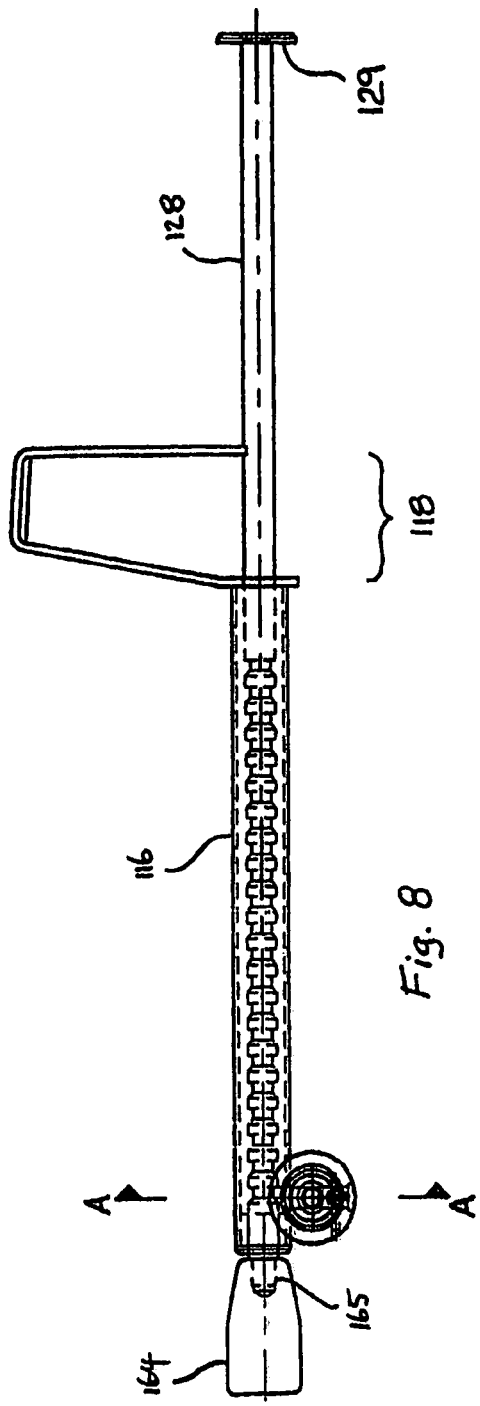

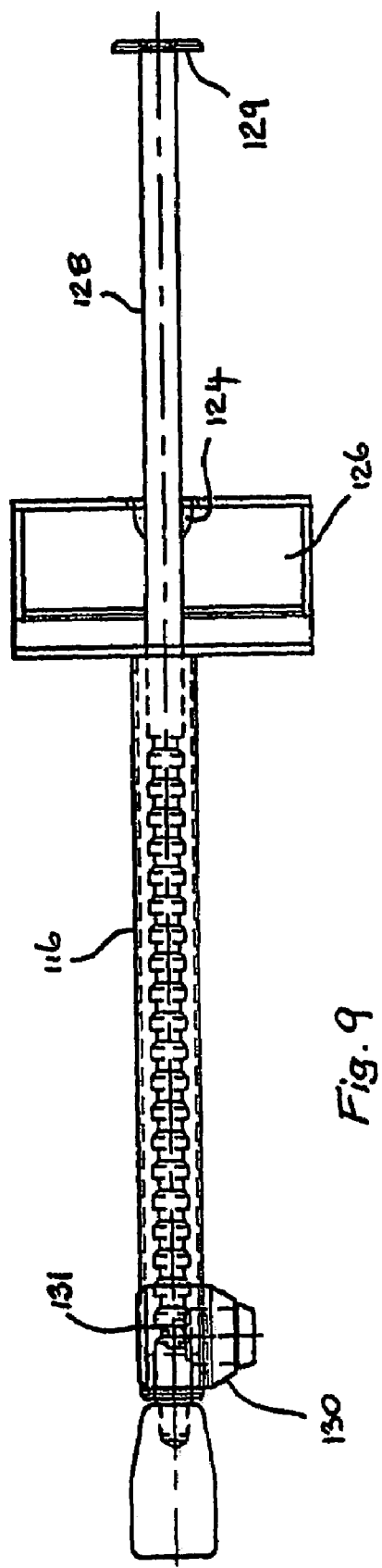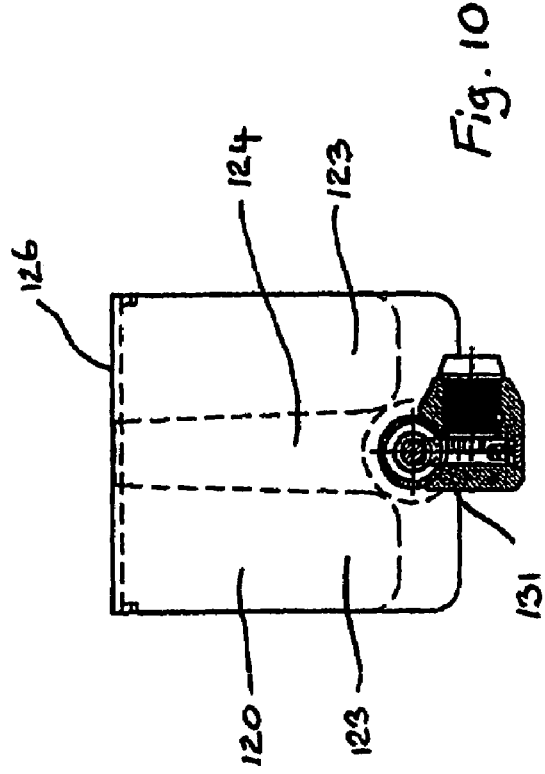

DEVICE FOR IMMOBILISING A MOTOR VEHICLE

CROSS REFERENCE TO RELATED APPLICATIONS

This application is a continuation of U.S. patent application Ser. No. 11/398,478, filed Apr. 5, 2006, now abandoned, which is a continuation of U.S. patent application Ser. No. 10/515,447, filed Jul. 26, 2005, now abandoned, which is incorporated by reference as if fully set forth. U.S. patent application Ser. No. 10/515,447 is a Section 371 National Phase Application of PCT/AU03/00631, filed May 22, 2003, which is incorporated by reference as if fully set forth.

FIELD OF INVENTION

This invention concerns the use of locking devices to immobilize motor vehicles such as cars, vans, trucks and the like.

BACKGROUND

The primary security means for protecting motor vehicles from theft or other unauthorised removal are door locks, steering locks and ignition locks. Many modern vehicles are also fitted with electronic immobilisers which prevent a computerised ignition and/or fuel injection system from working if a correctly coded key is used with the vehicle. However thieves have found ways to circumvent such devices by appropriate breakage of components of the vehicle and/or electrical interlinking, sometimes with sophisticated electronic devices carried to the vehicle by the thief.

Many types of mechanical immobilising devices are used as an adjunct to such primary vehicle security. These include bars clamped to steering wheels or gear change levers and clamps on road wheels. But clamps attached to the rims of steering wheels may be easily removed by using a bolt cutter to cut through the steering wheel rim, then bending open the rim, removing the lock, and bending the rim back into position for use in driving the vehicle away.

Many forms of lockable clamps have been developed which prevent rotation and removal of the road wheels. These tend to be more secure than steering wheel clamps but are larger, heavier and more awkward to transport and fit. For many people they are difficult to fit, and are inconvenient in the rain. They are also forcibly removable by a determined thief, particularly if they are not concerned about damaging the tires.

SUMMARY

Accordingly, one aspect the invention provides a method of immobilising a motor vehicle having a foot actuated brake pedal, said pedal being affixed at the end of a pedal arm, wherein: said pedal has a front face onto which a driver's foot would press to brake the vehicle, said pedal has a rear onto which said pedal arm is affixed, and said pedal arm is adapted to transmit force from the pedal to a braking system in the vehicle, said method comprising:—hooking around the brake pedal a pedal capturing portion of an immobilisation device, said pedal capturing portion having the form of a deep channel and said pedal capturing portion being firmly affixed to an elongate body portion of the device,—slidably extending from the elongate body portion a rigid strut portion downwards to beyond the pedal capturing portion, and locking the strut in such extended position such that said extended strut prevents depression of the brake pedal to its actuating position.

The strut may be extended until it reaches a floor or firewall of the motor vehicle while the pedal is in its undepressed position.

The channel's longitudinal axis is preferably substantially at right angles to the longitudinal axis of the elongate body. The channel-shaped pedal capturing portion may cover at least most of the front face and/or the rear of the pedal. The pedal capturing portion may largely envelop the pedal.

The elongate body is preferably tubular.

Preferably, the channel has two flange portions and a web portion, and one said flange portion has an open ended cutout or slot extending from one edge, and the pedal arm passes through the cutout when the strut is in said extended position. Preferably, the strut prevents removal of the pedal arm from the cutout.

Preferably, there are a plurality of positions at which the rigid strut is lockable. The locking of the strut may prevent both upwards and downwards movement of the strut relative to said body portion, but preferably it prevents upwards movement of the strut relative to said body portion but does not prevent downward movement of the strut relative to said body portion. The locking of the strut is preferably by means of a key operated barrel lock.

At the end of the elongate body distal of the pedal capturing portion, the immobilisation device may be hooked to a steering wheel of the vehicle by an elongate member slidably extendible from the body portion.

The body portion may be laid substantially horizontally on the floor of the vehicle and hooked to a seat component.

Another aspect the invention provides a device for immobilising a motor vehicle having a foot actuated brake pedal, said pedal being affixed at the end of a pedal arm, said device comprising: an elongate body portion having at or near one end thereof a means for capturing the brake pedal, said capturing means having an open-ended slot therein through which the pedal arm passes, a rigid strut slidably extendible from the body portion to beyond the pedal capturing means and past or through the open end of said slot, and means for locking the strut in its extended position to thereby prevent depression of the brake pedal and release of the pedal from the capturing means.

BRIEF DESCRIPTION OF THE DRAWINGS

In order that the invention may be more fully understood there will now be described, by way of example only, preferred embodiments and other elements of the invention with reference to the accompanying drawings where:

FIG. 7 is a side elevation of a device according to a further embodiment of the invention with the strut portion withdrawn prior to its installation to immobilise a vehicle;

FIG. 8 is a side elevation view of the device in FIG. 7 shown with the strut extended into its position for immobilising the vehicle;

FIG. 9 is a plan view of the device in FIG. 8 shown with its rigid strut portion extended; and FIG. 10 is a cross sectional view through plane A-A shown on FIG. 8.

DETAILED DESCRIPTION OF THE PREFERRED EMBODIMENTS

Figure 1:
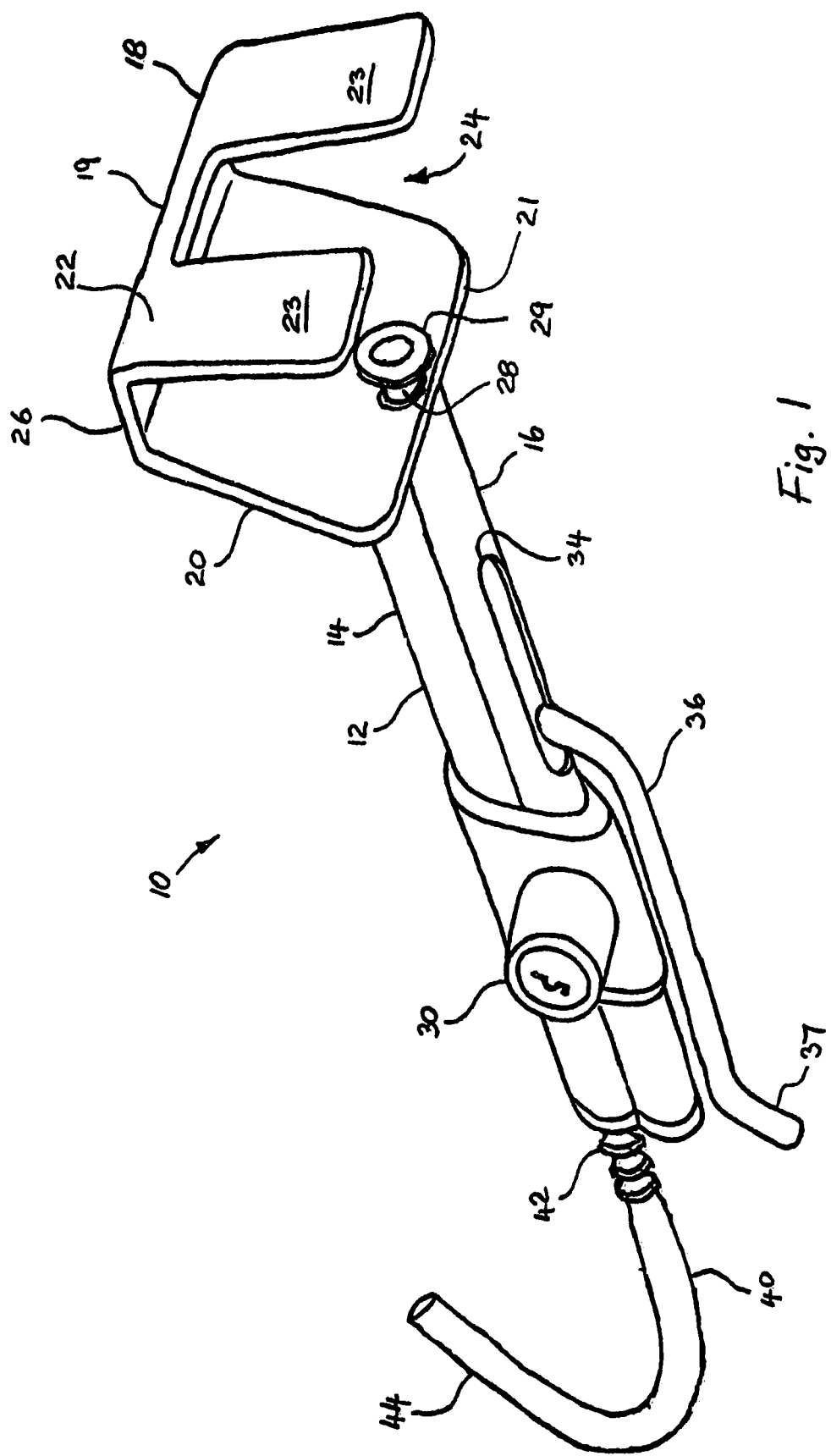
FIG. 1 is a perspective view of an immobilising device according to a first embodiment of the present invention.

In the drawings, like features in different embodiments are labelled with the same identifying numeral for ease of description.

Figure 2:
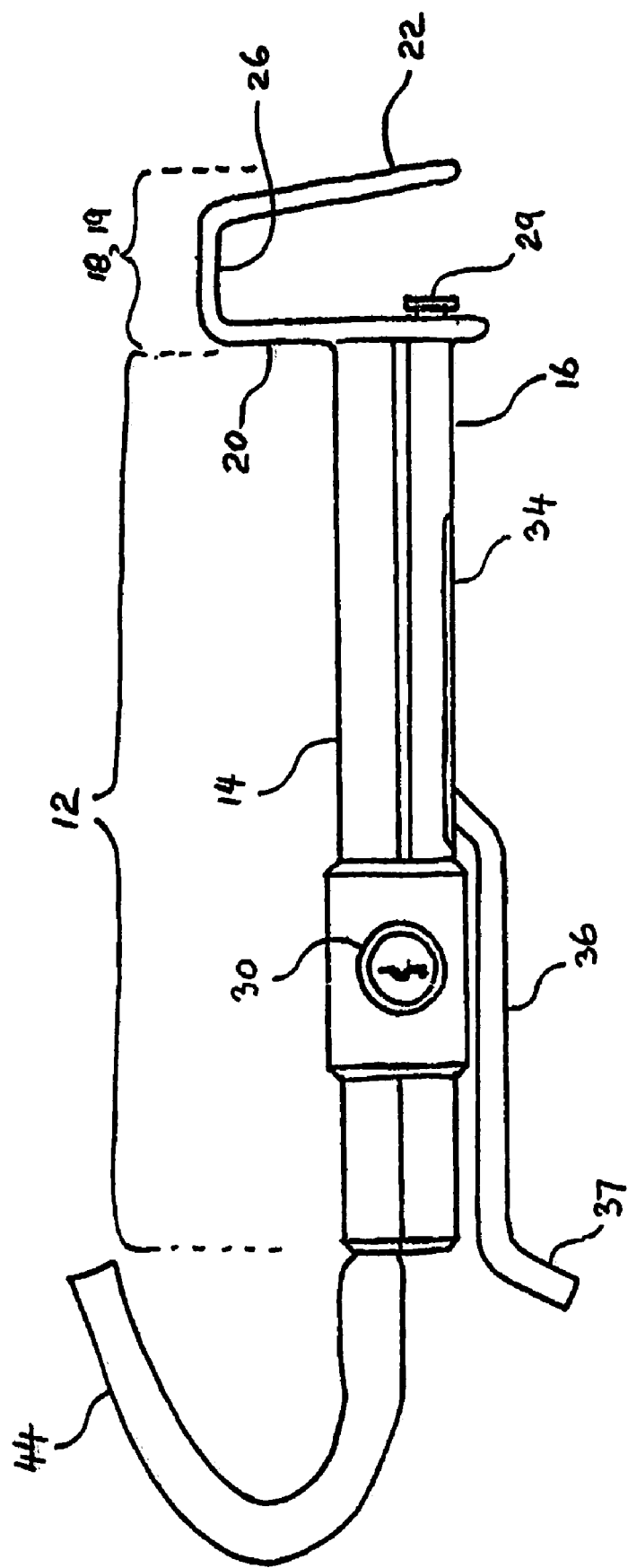
FIG. 2 is a side elevation view of the device in FIG. 1 shown in its usual storage configuration with its extendible members retracted.
Figure 3:
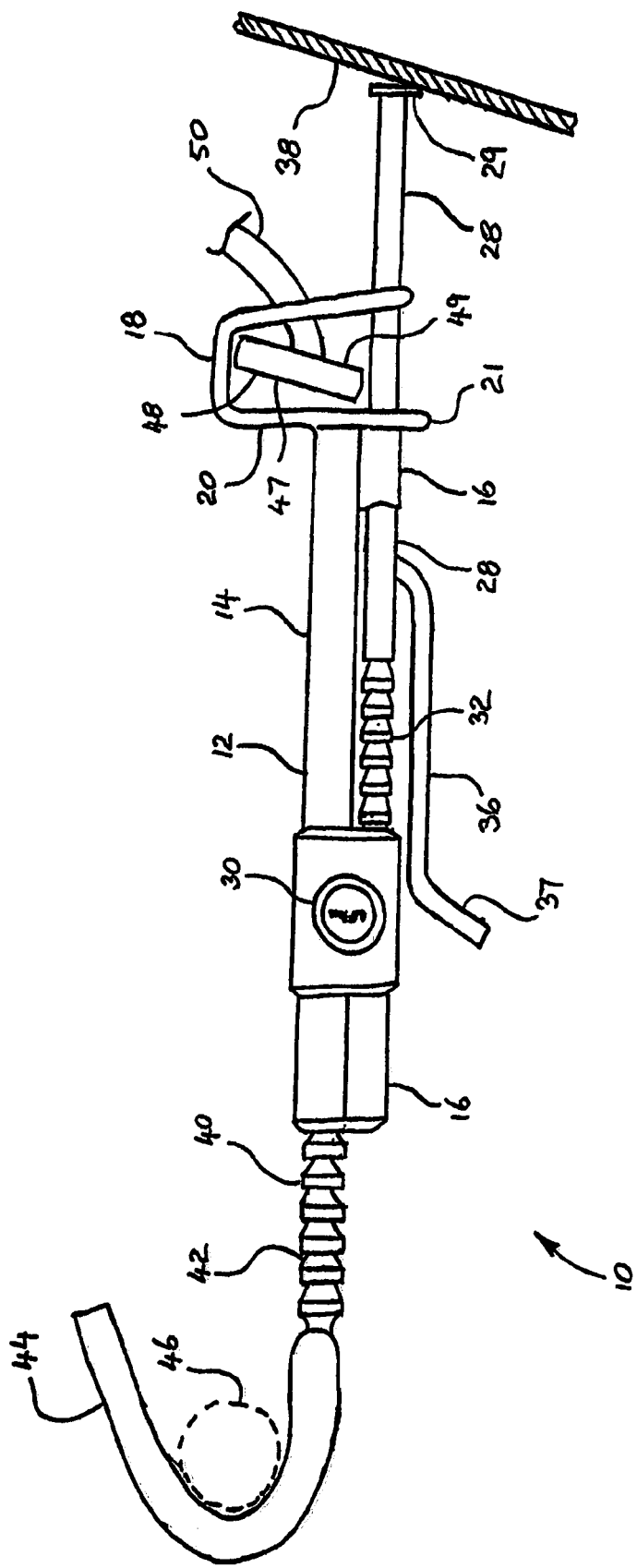
FIG. 3 is a partially cut away side elevation view of the device in FIG. 1 shown in its operating position engaged with a steering wheel and brake pedal of a motor car.

Referring to FIGS. 1 to 3, the immobilising device 10 has a central elongate body portion 12 comprising two tubular barrels 14 and 16 made from hardened steel. At one end of the body portion 12 is welded a clasping portion 18 made of steel which has the general form of a channel shaped member 19 aligned with its longitudinal axis at right angles to the longitudinal axis of the elongate body portion 12.

The clasping portion 18 is attached to the elongate body portion 12 at one of the flanges 20 of the channel section near the lip 21 of flange 20 and centrally in the longitudinal direction of the channel. The opposite flange 22, namely the flange distal of the body 12, carries a large slot or cut-out 24 positioned midway along its length and extending from its free edge into the flange 22 almost to the web portion 26 of the channel section. The cut-out 24 thus substantially divides the flange 22 into two arms 23 separated by the cut-out 24.

The clasping portion 18 forms a flattened hook with which the device 10 can, in use, grasp the pedal 48 of the brake pedal assembly. As used in this specification, the word "clasping" does not mean held with a clamping force between the flanges 20 and 22. It is meant that the pedal is held, perhaps loosely, such that it is captured and cannot escape the confines of the clasping portion.

One of the barrels 16 carries a steel rod 28 which is able to protrude into the pedal hook 18 and is slidably extendible from the barrel 16 until it protrudes through the cutout 24 and well beyond the flange 22. This extended position is illustrated in FIG. 3 whereas the retracted position is illustrated in FIG. 2.

On the body portion 12 is a barrel lock 30 which is associated with a spring loaded pawl or similar ratcheting device (not shown) such that the rod 28 may be extended from the barrel 16 by way a series of detent stops formed by a series of buttressed circumferential grooves 32 on the rod 28.

In the wall of the barrel 16 is a slot 34 which is elongated in the direction of the axis of the barrel and through which the rod 28 within is exposed. In FIG. 3, part of the barrel 16 is shown as cut away in order to show the rod 28 within. The slot 34 is on the cut away portion of the barrel 16.

Attached to the rod 28 and protruding through the slot 34 is a thinner rod 36 which forms a handle by which the rod 28 may be moved to and from its extended position as shown in FIG. 3 and its retracted position as shown in FIG. 2. The handle 36 is joined to the rod 28 between the lock 30 and the flange 20 and it is shaped to extend past the lock 30 and bend outwards at its free end to form a handgrip 37 conveniently accessible for the user.

The pedal clasping portion 18 is configured so that it can be slipped over the top of a brake pedal footpad 48 as shown in FIG. 3 with the downwardly extending arm 50 of the pedal passing through the cutout 24 and the pedal footpad 48 retained within the channel of the clasping portion 18. With the rod 28 extended, the footpad 48 cannot be removed from the clasping portion 18 and when the rod 28 is extended until it hits the floor or firewall 38 of the vehicle (as shown in FIG. 3) and the rod 28 is locked in that position, the brake pedal then cannot be depressed.

The vehicle is thereby immobilised because, even if the vehicle was started, there would be no way of effectively stopping it from a significant speed.

In practice, the rod 28 may not need to be extended until it contacts the floor 38. It is merely sufficient for it to be extended sufficiently so that the pedal cannot be depressed to a position where it actuates the brakes.

The upper barrel 14 also carries a steel rod 40 which is extendible from the barrel 14 and lockable by the lock 30 in any of a plurality of positions. This lockability is achieved by a series of circumferential buttressed grooves 42 which act in the same manner as the grooves 32 and co-operate with a spring loaded ratchet mechanism within the lock assembly. Whereas the ratchet action of the grooves 32 prevent the rod 28 being pushed into the corresponding barrel 16, the action of the grooves 42 are to prevent the rod 40 being pulled from the barrel 14.

On the free end of the rod 40 is a hook 44 which, in use, is hooked over the rim of the steering wheel of the vehicle after the rod 28 is extended as far as possible. The hooked rod 40 is then pressed into the barrel 14. The key does not need to be in the lock for this locking operation but the key is required to release the pawl from the grooves 32 and 42 in order for the rods 28 and 40 to be extended from the body and the device removed from its operable position.

In another embodiment of the invention, the hook 44 is not locked in position to provide a securing device but instead provides merely a stabilising feature for the upper end of the device. The hook 44 may in this embodiment be attached by an elastic cord to the body 12.

Figure 4:
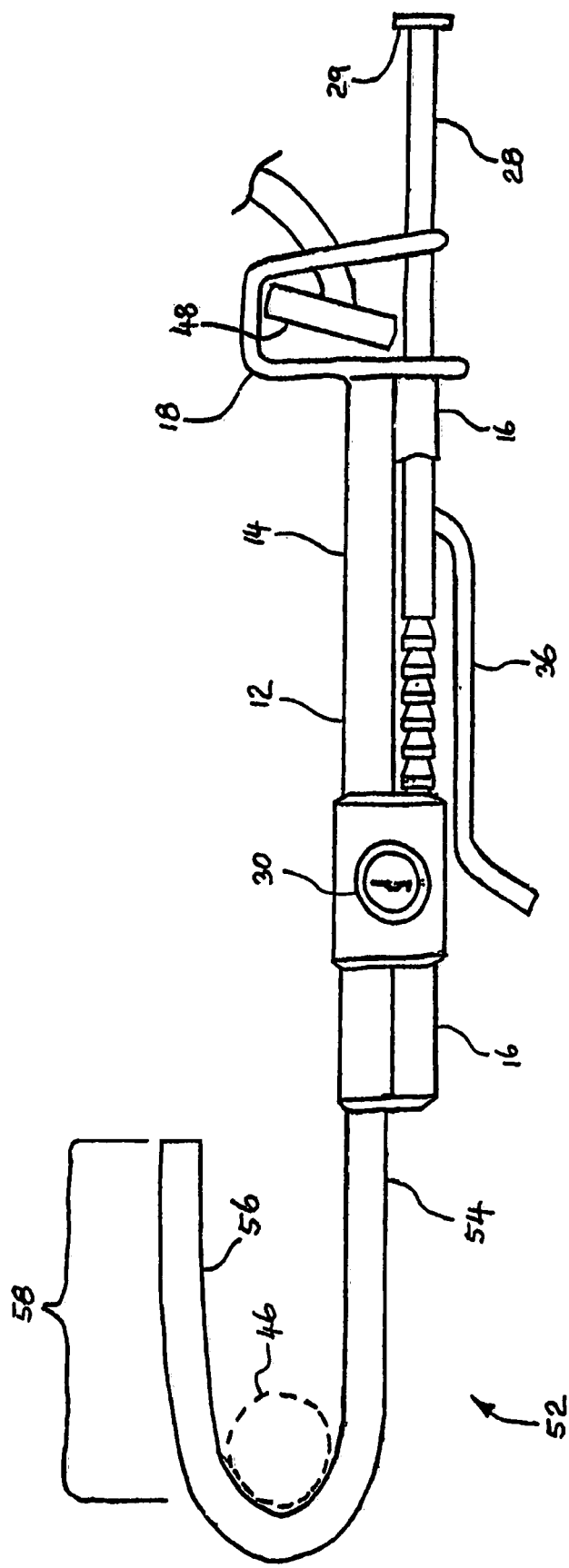
FIG. 4 is a side elevation view of a device according to another embodiment of the invention.

In the embodiment of the invention shown in FIG. 4, the device 52 has, replacing the grooved rod 40 with its hook 44, an alternative rod 54 carrying a substantially longer hook 56. The end of the rod 54 within the barrel 14 is not grooved in the manner of the grooves 42 shown in FIG. 3, but instead the rod is permitted to move backwards and forwards longitudinally within the barrel 14 for a maximum displacement of less than, and preferably about 50% to 70% of, the length of the turned back portion 58 of the hook 56. The rod 54 is spring loaded with a bias towards pulling the rod 54 inwards to the body 12.

The end of the rod 54 is held captive within the barrel 14 but the rod 54 does not engage with the lock 30. However the rod 54 is free to rotate about the longitudinal axis of the barrel 16. When using the immobilising device 52, the hook 56 is first placed around a section of the steering wheel rim 46 and the body 12 is pressed down, against the bias spring acting on the hook 56, until the clasping portion 18 can be slipped over the pedal footpad 48. The handle 36 is then used to extend the rod 28 to the floor, as described above in relation to FIG. 3, and locked at that extension by means of the lock 30. It may then be possible to lift the hook back a little from the steering wheel rim, but this movement would be insufficient to allow the hook 56 to be removed from around the steering wheel rim.

In another embodiment, a steering wheel engagement portion is not provided at all but instead a rubberised strap or velcro strap is provided whereby the elongate body portion 12 may be strapped to the steering column of the vehicle when in use. In this embodiment some cushioning means may be provided on the body 12 where it rests against the steering column.

As a further alternative the hook 44 may be used, or replaced by a suitable engagement means, for locating onto the frame at the lower front of the seat of the vehicle.

Figure 5:
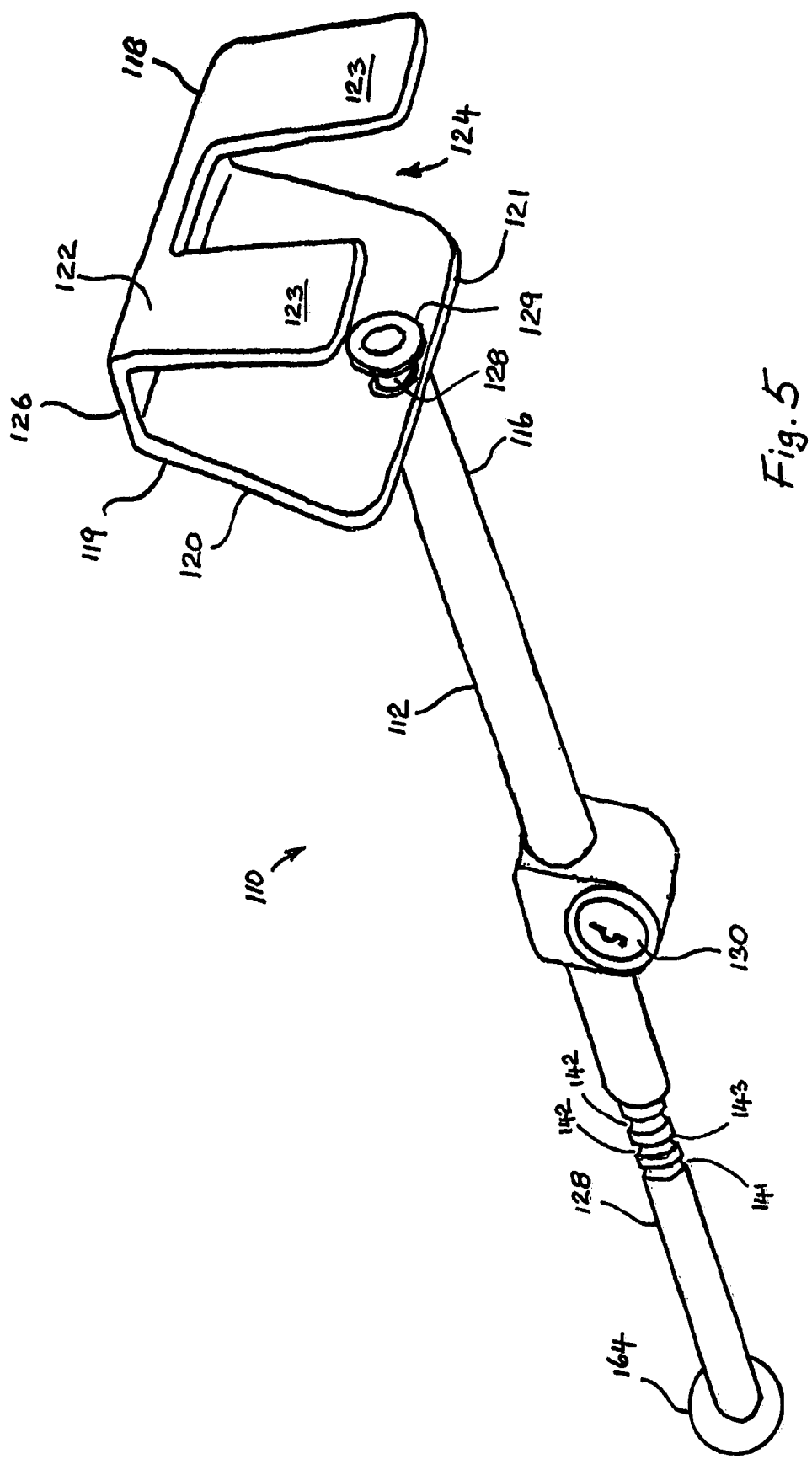
FIG. 5 is a perspective view an immobilising device according to a further embodiment of the present invention.
Figure 6:
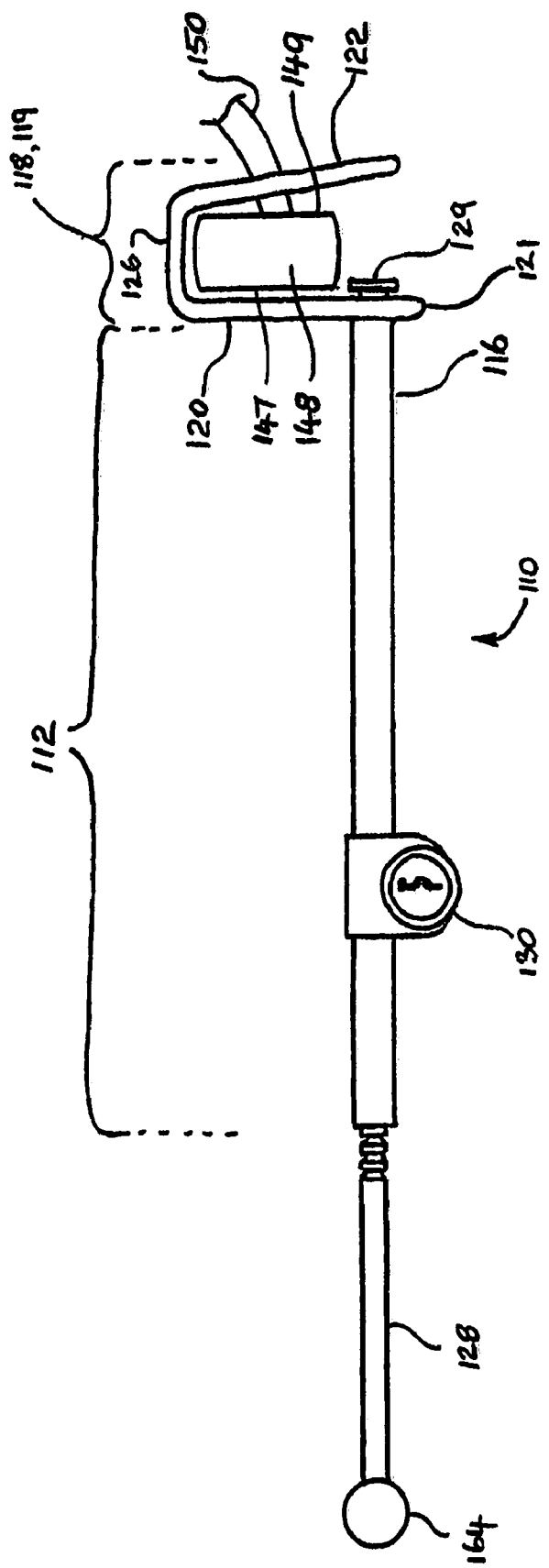
FIG. 6 is a side elevation view of the device in FIG. 5 shown with its rigid strut portion withdrawn from the position it would be locked when immobilising a vehicle.

Referring to FIGS. 5 and 6, the immobilising device 110 has an elongate body portion 112 comprising a tubular barrel 116 made from hardened steel. At one end of the body portion is welded a clasping portion 118 of the same configuration as the clasping portion 18 described with reference to FIGS. 1 to 3. The clasping portion 118 has the general form of a deep channel shaped member 119. The clasping portion 118 is aligned such that the longitudinal axis of its channel is at right angles to the longitudinal axis of the barrel 116.

The clasping portion 118 is attached to the barrel 116 at one of the flanges 120 of the channel section near the lip 121 of flange 120 and centrally to the longitudinal dimension of the channel. The opposite flange 122, namely the flange distal of the barrel 116, carries a large cut-out 124 positioned midway along its length and extending into the flange 122 almost to the web portion 126 of the channel section 119.

A steel rod 128 is able to protrude into the pedal hook and is slidably extendible from the barrel 116 until it protrudes through the cutout 124 and well beyond the flange 122 but this extended position is not shown in the drawings of this embodiment.

On the body portion 112 is a barrel lock 130 which is associated with a spring loaded pawl 131 (shown in FIGS. 9 and 10) or similar ratcheting device such that the rod 128 may be extended from the barrel 116 by way of a series of detent stops 141 formed by a series of buttress 143 to circumferential grooves 142 such as described with reference to FIGS. 3 and 4.

The steel rod 128 protrudes from the end of the barrel 116 distal from the pedal clasping portion 118 and is screw threaded 165 into a plastic knob 164 which acts as a handgrip for the user.

The pedal clasping portion 118 is configured so that it can be slipped over the top of a brake pedal 148 as shown in FIG. 6 with the downwardly extending pedal arm 150 passing through the cutout 124 so the pedal 148 is retained within the channel of the clasping portion 118. With the rod 128 extended, the foot pedal 148 cannot be removed from the clasping portion 118 and when the rod 128 is extended until it hits the floor or firewall of the vehicle and the rod 128 is locked in that position, the brake pedal then cannot be depressed. The pedal clasping portion 118 preferably extends beyond the side edges of the pedal in order to restrict the ability to angularly wobble the pedal in the channel. The pedal clasping portion 118 thus largely envelops the pedal.

An end plate 129 is welded to that end of the rod 128 which is at the pedal clasping end 160 of the immobilising device. This can be conveniently made by slipping a washer over the end of the rod 128 and welding it in that position. The end plate 129 serves to prevent the device being disabled by hitting it firmly axially so that the rod punctures the firewall of the vehicle thus allowing the brake pedal to be depressed. The outside diameter of the end plate is sized to be a loose fit through the cutout 124.

The embodiment shown in FIGS. 7, 8, 9 and 10 is a variation of that shown in FIGS. 5 and 6. All of the features described above with reference to FIGS. 5 and 6 are also in FIGS. 7, 8, 9 and 10 and for clarity the features have accordingly been identified by the same numbers. A particular feature of the embodiment in FIGS. 7 to 10 is that the lock 130 is positioned close to that end of the barrel 116 which is uppermost when the device 110 is being installed in the motor vehicle. This serves to reduce the overall length of the device and allows improved access to the lock in use.

The embodiment described with reference to FIGS. 5 and 6 is not fastened to the steering wheel or steering column.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

For example, although the invention has been described particularly in relation to motor vehicles such as cars, vans, trucks and the like, it is also applicable to a diverse range of other vehicles such as tractors, heavy earthmoving equipment, snowmobiles and ride-on lawn mowers for example.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

What is claimed is:

1. A device for immobilising a motor vehicle having a foot actuated brake pedal, said pedal being affixed at the end of a pedal arm, said device comprising:

an elongate body portion having at or near one end thereof a pedal capturing portion for hooking around the brake pedal, said pedal capturing portion having an open-ended slot extending into a side edge thereof through which the pedal arm passes;

a rigid strut slidably extendible from the body portion to beyond the pedal capturing portion to contact the floor or firewall of the motor vehicle while the pedal is in its undepressed position; and means for locking the strut in its extended position in contact with the floor or firewall of the motor vehicle to thereby prevent depression of the brake pedal and release of the pedal from the capturing portion, wherein the rigid strut is slidably extendible from the body portion to beyond the pedal capturing portion and through the open end of said slot.

2. A device according to claim 1 wherein the strut prevents removal of the pedal arm from the slot.

3. A device according to claim 1 wherein the pedal capturing portion comprises a channel shaped member, the longitudinal axis of which is substantially at right angles to the longitudinal axis of the elongate body portion.

4. A device according to claim 2 wherein the pedal capturing portion comprises a channel shaped member, the longitudinal axis of which is substantially at right angles to the longitudinal axis of the elongate body portion.

5. A device according to claim 3 wherein the pedal capturing portion covers the front face of the pedal.

6. A device according to claim 1 wherein the pedal capturing portion covers most of the rear of the pedal.

7. A device according to claim 2 wherein the pedal capturing portion covers most of the rear of the pedal.

8. A device according to claim 3 wherein the pedal capturing portion covers the front face of the pedal and most of the rear of the pedal.

9. A device according to claim 1 wherein the pedal capturing portion envelops the pedal.

10. A device according to claim 2 wherein the pedal capturing portion envelops the pedal.

11. A device according to claim 1 wherein the elongate body portion is tubular.

12. A device according to claim 2 wherein the elongate body portion is tubular.

13. A device according to claim 1 wherein said locking of the strut prevents upwards movement of the strut relative to said body portion but does not prevent downward movement of the strut relative to said body portion.

14. A device according to claim 2 wherein said locking of the strut prevents upwards movement of the strut relative to said body portion but does not prevent downward movement of the strut relative to said body portion.

15. A device according to claim 1 wherein said means for locking of the strut is a key operated barrel lock.

16. A device according to claim 2 wherein said means for locking of the strut is a key operated barrel lock.

* * * * *